Jan. 13, 1970     J. C. MARTEL     3,489,909
METHOD AND APPARATUS FOR AUTOMATIC SEVERANCE OF A MOVING
SHEET ALONG A LINE INSCRIBED THEREIN
Filed Sept. 28, 1965     3 Sheets-Sheet 1
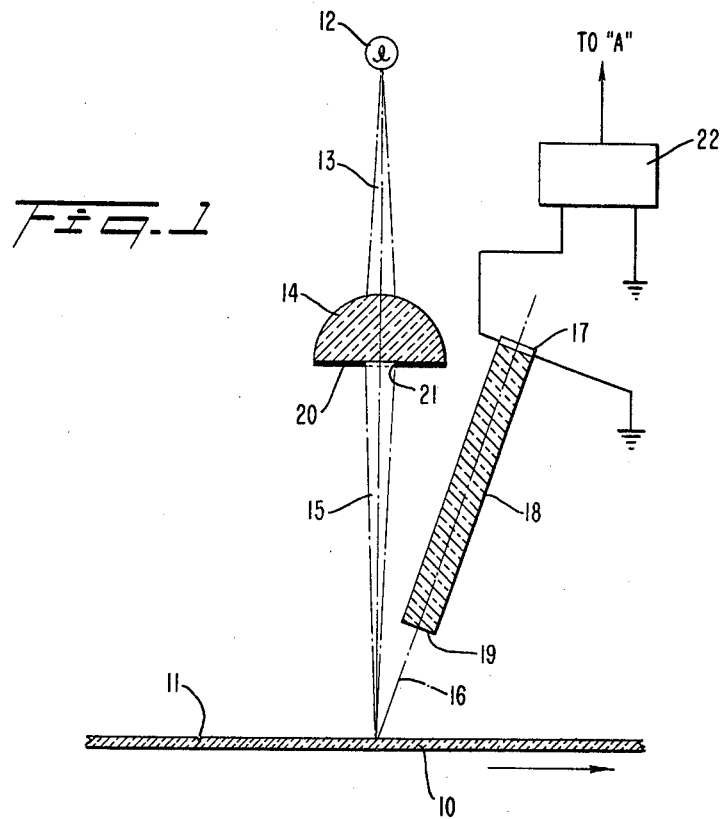
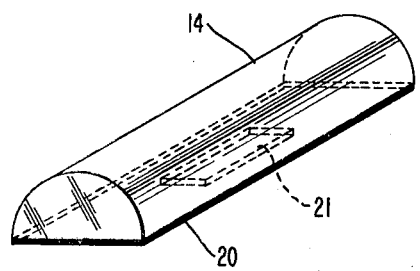
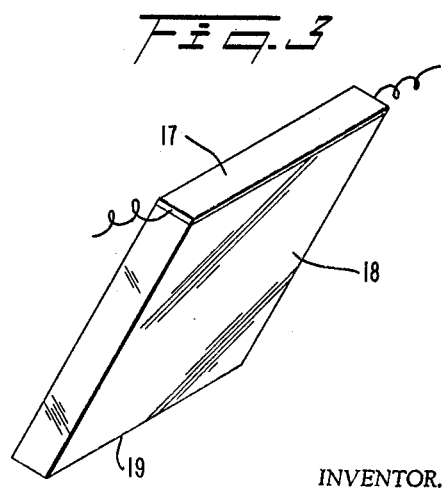
INVENTOR.
JEAN CLAUDE MARTEL
BY
Bauer and Seymour
ATTORNEYS

INVENTOR
JEAN CLAUDE MARTEL

By Bauer and Seymour
ATTORNEYS

United States Patent Office 3,489,909
Patented Jan. 13, 1970

3,489,909
METHOD AND APPARATUS FOR AUTOMATIC SEVERANCE OF A MOVING SHEET ALONG A LINE INSCRIBED THEREIN
Jean Claude Martel, Franconville, France, assignor to Compagnie de Saint-Gobain, Neuilly, Seine, France
Filed Sept. 28, 1965, Ser. No. 490,925
Claims priority, application France, Sept. 30, 1964, 989,894
Int. Cl. G01n 21/30
U.S. Cl. 250—219                                    16 Claims

ABSTRACT OF THE DISCLOSURE

Method and apparatus for detecting a line formed on a moving sheet or ribbon of glass, and disposed transversely of its direction of movement and along which the sheet is to be subsequently severed by mechanical means. Light from a source is projected onto the sheet to form a narrow line parallel with the line along which the sheet is to be severed, and upstream from the cutting or breaker means. A photoelectric cell device is aimed at the line of illumination but is normally out of range of rays reflected from the sheet. When in the course of movement of the sheet, the line formed thereon coincides with the line of illumination, rays are dispersed by the line on the sheet. The dispersed rays are collected and concentrated upon the photoelectric cell device. A circuit including the device incorporates a time delay and is connected to control the downstream severance means so that as soon as the line inscribed upon the sheet has moved into proper relation with respect to the severance means, the latter is energized to sever the sheet at and along the inscribed line. Due to the fact that the projected line is longer than the corresponding parallel dimensions of random defects in or on the sheet, the apparatus is insensitive to defect spots, dust or other accidental imperfections in or on the sheet. Thus severance of the sheet at and along these defects is avoided. The invention is equally useful with materials other than glass, such as plastics.

---

This invention relates to a process and apparatus for detecting score lines in a glass sheet and activating a glass breaker as the score line passes it. The invention is especially useful in the continuous manufacture of glass sheet, in which molten glass is formed into a sheet by rolling, or casting onto the surface of a molten metal bath, which is cooled to a temperature at which it can be handled by ordinary handling means, is removed, annealed and cooled, and is cut into sizes adapted to ready handling or to sale. The traditional method of cutting the sheet was manual but in recent years progress has been made in mechanical cutting in which the sheet is scored on its upper surface by a hard pointed scribe and broken along the score line by controlling mechanism. Such apparatus has had a number of imperfections among which are activation of the breaker by aberrations other than the score line, and from difficulty in timing the operation of the breaker to coincide with the arrival of the score line at the breaker.

When the breaking is to be carried out without interrupting the movement of the sheet of glass, which is the usual case in the production of glass, the object has been to time the break to the arrival of the score line made by the scribe. The release of the breaker has been initiated by a signal derived from an apparatus which detects the score line at some location upstream of the breaker. The detector must satisfy two certain conditions if the function is to be accomplished satisfactorily: it must detect all the score lines, even the most fine, but it must not be excited to operating pitch by such defects as dust particles, accidental gouges, bubbles in the glass, or any of the other accidental imperfections which are normally found in glass sheet as it leaves the machine. Such apparatus has been imperfect in these respects.

Such apparatus must also be strong, not bulky, must not require adjustment of too great delicacy, must be inexpensive in cost, and must be as simple in construction as possible.

The objects of the invention are to provide a novel process and a novel apparatus for detecting lines traced on a moving sheet and which can be adjusted to recognize only lines of selected magnitude and to distinguish between applied lines and other aberrations accidently occurring in such sheets.

The objects of the invention are accomplished generally speaking by a method of detecting lines traced on moving sheets which comprises imposing upon the sheet a light beam of width approximating the width of the line and of length greater than the length of light deflecting aberrations accidentally occurring in such sheets, lying parallel to the line and in the path thereof, gathering light rays deflected, when a line and the light beam coincide, along substantially the whole length of the lighted segment of the line and activating signaling means by the dispersed rays. They are also accomplished by apparatus for detecting a light deflecting line in a relatively moving sheet and of distinguishing between it and aberrations of different magnitude and shape which comprises means to project a linear beam of light upon the moving sheet in the path of the line and parallel thereto, and light responsive signalling means aimed at the intersection of the light beam with the sheet, outside the path of the undeflected beam.

In the accomplishment of the invention a novel electronic control has been invented which is adjustable in sensitivity, easy in operation, and relatively simple in construction.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic elevational view of the novel detector which forms part of the novel apparatus;

FIGS. 2 and 3 are detailed views in perspective of parts of the apparatus of FIG. 1;

Figure 4:
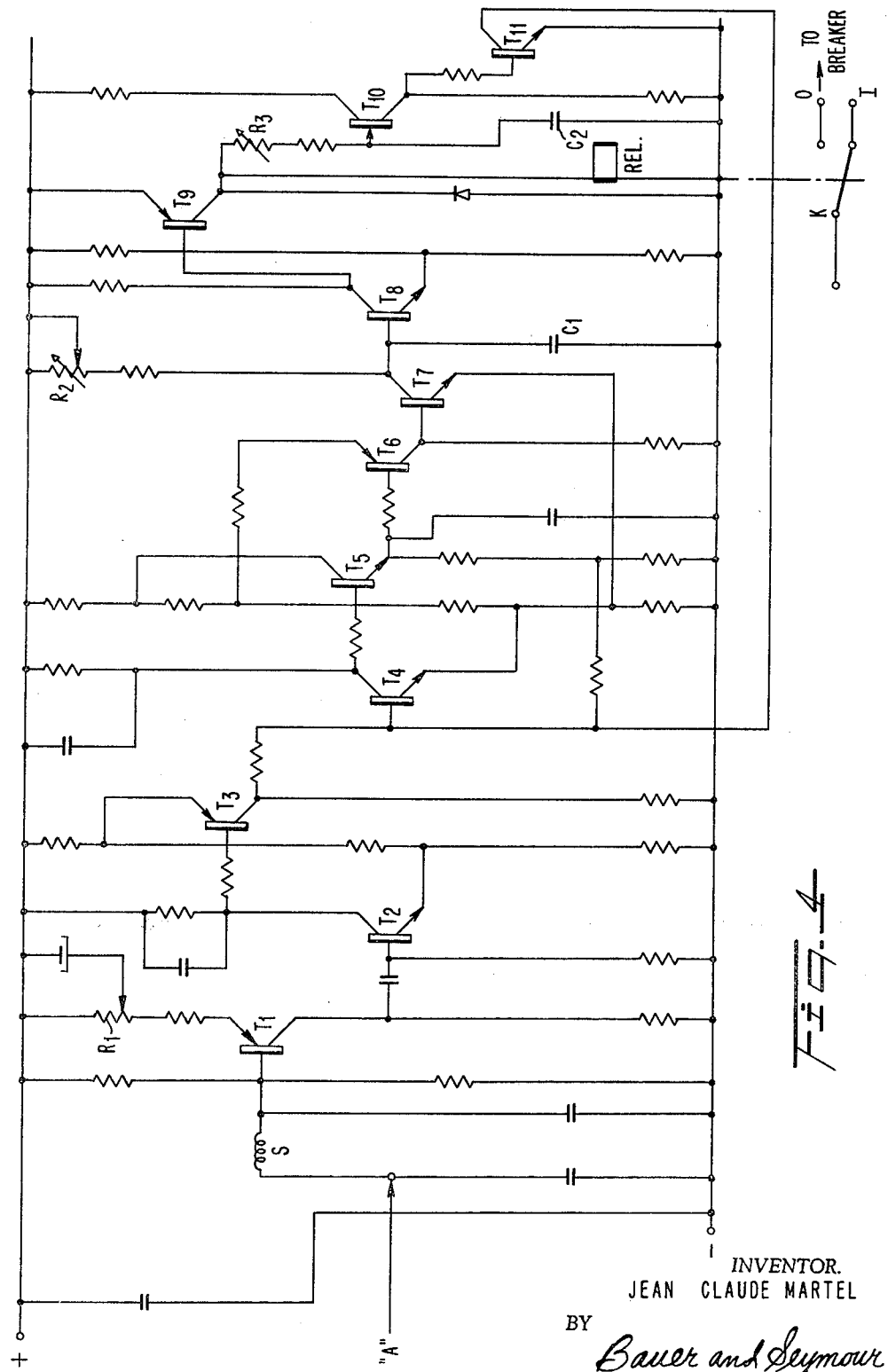
FIG. 4 is a circuit diagram of the novel electronic signal which activates the breaker.

In FIG. 1 the numeral 10 indicates a glass sheet which may be presumed to be traveling in the direction of the arrow. A score line 11, exaggerated for purposes of illustration, has been cut into the surface of the sheet by a scribe upstream and off the drawing. The scribe line is normally a straight line at right angles to the longitudinal axis of the sheet and the description will be directed to the detecting of such a line and the operation of the breaker from it. Extending transversely of the sheet and parallel to the score line 11 is an electric light filament 12 of a length sufficient to extend over a substantial part of the score line; for instance it may have a length of approximately 5 cm. The beam 13 from this straight line filament is directed upon a demi-cylindrical lens 14, the major axis of which is parallel to line 11 and to the filament. The lens focuses the beam 15, which issues from it, in a line on the surface of the glass. The lens is preferably placed so that the beam is perpendicular to the sheet.

In the preferred form of the invention the image of the filament will be focused on the upper surface of the glass. Some of the beam will pass through the glass and be lost and some of it will be reflected back upon itself with a minimum of dispersion. When the line 11 coincides with the image of the filament, or with the line of light on the glass, as the case may be, the beam will be dispersed in various directions upward, in rays of substantial intensity, some of which will go in a direction indicated by the dot and dash line 16.

Located at right angles to the line 16 is an elongated current-generating means such as a photoelectric cell 17, the length of which is usually equal to the length of the beam in order to receive light rays deflected along the whole length of the beam. As the cell has not only length but width it receives not only the rays 16 but rays on either side of rays 16 to its total width. The photoelectric cell is out of the line of beams 13, 15 and is not activated by them. Dust particles, bubbles in the glass or other accidental imperfections intersect the light beam only over part of its length and therefore the amount of light gathered by the cell will be smaller than when a line intersects the beam along its whole length. The cell and the apparatus associated with it are made of such sensitivity as to activate the breaker only when a line intersects the beam along its whole length.

In the preferred form of the invention the cell 17 will be mounted on one end of a light-conductor 18 which may be made of glass with polished surfaces, or may be made of transparent resins such as methyl methacrylate or the like. This light-conductor will be placed with one end 19 aimed at the image of the filament on the glass at a small angle with respect to the vertical. When the score line 11 coincides with the end of the beam 15, the rays projected will be gathered by the full area of end 19 and carried through the light conductor to the photoelectric cell 17, which is mounted on its other end. In order to further restrict the rays which come from the lens, a mask may be associated with the lower, flat face of the lens 14. This mask may be provided with an aperture 21 which encompasses the main portion of the beam from the filament and intercepts diffused light, limiting the beam 15 and preventing a diffusion of light which would reflect into the light-conductor and activate it at hazard.

The output line of the cell is connected to an amplifier 22 and the output of the amplifier is connected to terminal A of FIG. 4.

The first characteristic of the invention is that when the scored line traced on the surface of the sheet passes into and coincides with the line of light lying on the surface of the glass some of the rays deflected by the score line, throughout the length equal to that of the line of light and of the light-conductor, will be directed toward the cell, which will emit a signal indicating that the line has reached this exact position. Accidental defects in or on the glass will also deflect or disperse some of the light when it passes through the same position, but it will only involve a negligible amount of light, and the amount of light received by the cell will be much less than that which will generate a current sufficient to activate the breaker. However, should this inherent characteristic of the detecting device be avoided for one reason or another, the electronic part of the equipment contains further safeguards.

According to another characteristic of the invention there is projected upon the surface of the glass an image of a straight filament so that when the score coincides with the image, the luminous rays will be concentrated along the score in a very thin line. This results in detection with great precision so that, in effect, the detection occurs at the precise moment when the score is perfectly aligned with the filament, and the apparatus is not activated by diffused light or auxiliary rays on either side of this position. Furthermore, this results in a stronger signal because of the concentration of the light in the score line and a strong consequential deflection and dispersion.

According to another characteristic of the invention the dispersed light is received in a light-conductor which accepts a wide band of deflected rays and transmits them to the face of the cell. In order to accomplish this, one of the ends of the light-conductor, having a length substantially equal to that of the segment of the score which is illuminated, is arranged parallel to and near this segment and the photocell is applied to the opposite end.

In the preferred form of the invention the beam is directed perpendicularly to the surface of the sheet and the light-conductor makes an angle with this surface as close to 90° as the lamp structure will permit, in order to capture the greatest intensity of reflection. With this arrangement an important proportion of the dispersed rays is captured and transmitted to the cell.

The beam may be produced by different optical means but it is particularly advantageous to use demi-cylindrical lenses having one planar face. On the other hand a cylindrical mirror can be used above the filament 12, the curvature of the mirror being such as to focus the rays in a line on the moving sheet. These lenses and mirrors do not give a true image of the filament but are accompanied by considerable diffusion, but this objection can be overcome by using a diaphragm which eliminates the largest part of the diffused light. These may be used with a sufficient approximate to form on the surface of the sheet a line of light which will coincide with the line of the score.

The output from the amplifier 22 goes to jack A of the electronic apparatus of FIG. 4, which illustrates a novel circuit adapted to carry out the novel functions of this portion of the invention. It is advantageous to use an alternating amplifier to amplify the signal emitted by the cell. Such amplifiers are simple, strong, insensitive to temperature change, and inexpensive. Their construction is known and need not be described, and they may be employed in this use because the signals emitted by a passage of the score through the line of light have a relatively short wave length which varies little from signal to signal because the wave length is related to the speed of displacement of the glass relative to the beam, and this is substantially constant. Such amplifiers may be used advantageously for relative speeds above 2 cm./sec. but if the speed of the sheet varies outside of the accurate limits of such amplifiers, one may substitute amplifiers of direct current type. The apparatus of FIG. 4 is designed for use with alternating amplifiers.

The electronic chassis herein described permits the use of the detector described above to activate a breaker or other apparatus.

In FIG. 4 the current may be considered to flow between a + power line at the top of the figure and a − power line at the bottom. A switch K can be thrown by the relay REL from a normally inoperative position I to an operative position O which is connected to the breaker, being returned under spring pressure to position I when the breaking function has been completed. The flow of current between the + and − lines is controlled by a series of transistors T, variable resistors R, and capacities C, the functions of which will be described. The remaining electrical instruments shown in the drawing are of standard construction and function which will be understood by engineers and need not be described.

The amplified signal which arrives at A flows to a self-inductance S the value of which is established so as to eliminate high frequency signals such as parasitic currents originating within the apparatus from a source other than the scanning beam, but which allows signals from the scanning beam to pass to the transistor $T_1$. A variable resistance $R_1$ permits the gain of the transistor to be regulated so as to eliminate signals having an amplitude less than the level which corresponds to the signals generated by the passage of the scanning beam of the finest score which has been put into the surface of the glass by the scribe. This will also eliminate signals generated by the scanning beam as it passes over accidental defects in the glass, except in the extremely rare instances when an accidental scratch appears which is almost as long as the scanning beam and parallel to it. When a signal arrives from inductance S at the base of the transistor $T_1$, the voltage of the base is reduced. The transistor $T_1$ then becomes a conductor. The potential collector of transistor $T_2$ is fixed. The variable resistance $R_1$ is set to a value such that only the signals of magnitude superior to the level set by transistor $T_2$ will make it a conductor. When such a signal arrives, it flows to transistor $T_3$ which also becomes conductive. The current then flows to $T_4$ and $T_5$ which become conductive. As soon as $T_5$ becomes conductive the potential of the base of $T_4$ increases and it becomes permanently conductive, as does $T_5$. To the left of these transistors, on the drawing, the flow of current is in impulses but to the right it is continuous. The signal emanating from $T_5$ goes to the base of transistor $T_6$ which is normally conductive and blocks that transistor as well as transistor $T_7$, which is also normally conductive and which has the function of short circuiting the first capacity $C_1$, until a signal comes from $T_6$. This arrangement accomplishes the valuable function of achieving accuracy in timing the passage of the signal to the relay. This timing assures that the breaker will act when the score in the glass is in exact position for the breaking. The capacity $C_1$ now charges itself, the duration of the charge being regulated by adjusting the variable resistance $R_2$. A lag is thus introduced into the transmission of the signal until the base potential of the transistor $T_8$ has attained a sufficient magnitude. When this level has been attained the transistor $T_8$ becomes a conductor and the flow of current from it to the base of the transistor $T_9$ makes it also a conductor. Current can now flow between the $+$ and $-$ power lines through the transistor $T_9$ to the relay, which throws the switch K and activates the breaker. Simultaneously the capacity $C_2$ is charged and the duration of the charge is regulated by adjusting variable resistance $R_3$. When the selected level of charge has been attained the double-base diode $T_{10}$ sends a signal to transistor $T_{11}$ which reduces the voltage of the base of transistor $T_4$ to 0, ending its conductivity and ending the signal. The signal which excited the relay REL is stopped. It will be observed that the duration of the signal which activates the relay is regulated by the variable resistance $R_3$. The transistors $T_6$ and $T_7$ become conductors instantaneously, the entire apparatus has been returned to its inactive state, and it is ready for the next signal which comes from the scanning beam.

This chassis will be observed to comprise a low pass filter circuit, a high pass filter circuit, a timer circuit which matches the excitation of the breaker to the speed of the sheet, a second timer circuit which compensates for the lag of the relay, an operating circuit, and a circuit of restoration which returns the apparatus to inoperative state ready for the next excitation.

Figure 5:
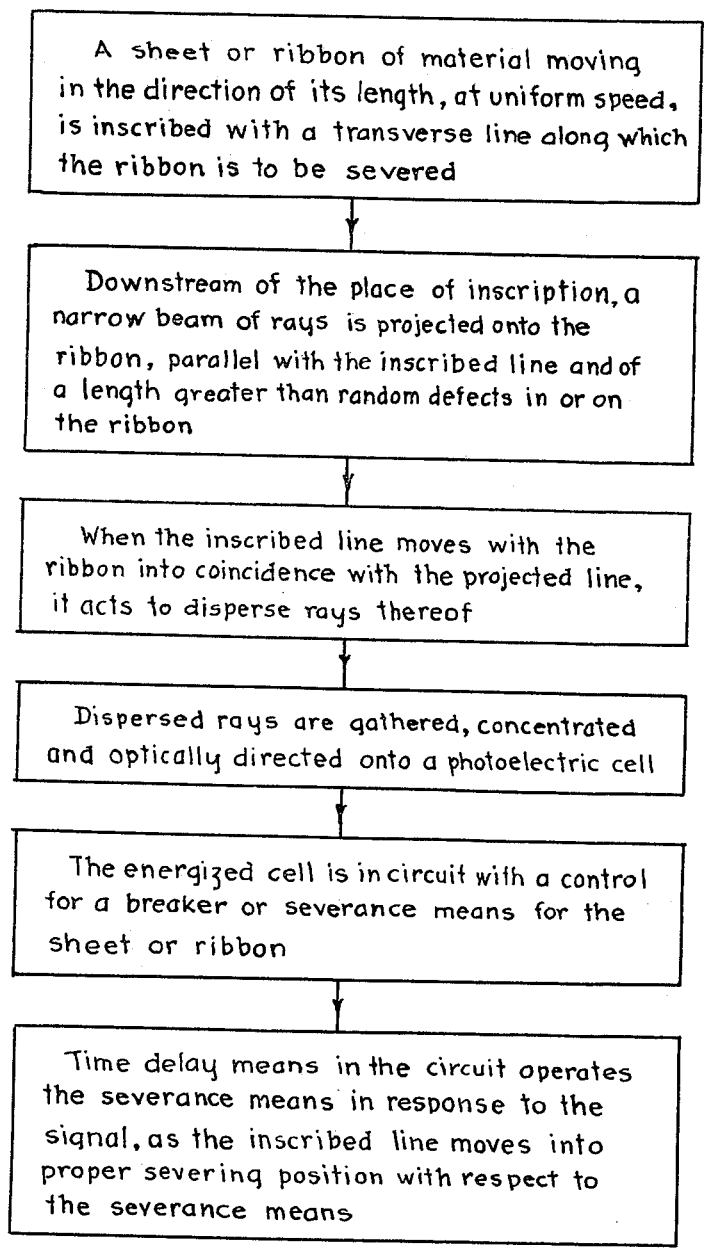
FIGURE 5 is a flow diagram explaining the sequential steps involved in performance of the invention.

The apparatus functions as follows, reference being made in particular to the flow diagram shown at FIGURE 5.

The scanning beam will be located upstream of the breaker, and the speed of the glass sheet will be constant. The scribe will be applied upstream of the scanning beam. When the score made by the scribe reaches the scanning beam it disperses the light of the beam in various directions some of which enter the light-conductor and activate the photoelectric cell, the impulses from which go to the amplifier. The signal from the amplifier is delivered to the electronic apparatus which times the operation of the breaker so that it acts only when the score line in the glass has traveled from the location of the scanning beam to breaking position. The apparatus provides for the exact adjustment of this interval so that the scanning beam can be located at different distances from the breaker. As soon as the breaker has been activated the apparatus returns itself to inoperative position.

The magnitude of the signals emitted by the scanning beam, when it is affected by aberrations of small size, is too small to activate the apparatus as the signal required to activate the apparatus may be set at a value which is only satisfied by the dispersed light deflected from a major portion of the length of a line lying parallel to the beam. The apparatus provides for adjustment and variation of this setting. The apparatus rejects signals above and below the range of magnitude selected by the operator of the machine. The apparatus is inexpensive and precise. It eliminates much accidental breakage which was previously caused by accidental imperfections in the sheet, damage to its surface, and accretions of particles.

As many apparently widely different embodiments of the present invention may be made without departing from the spirit and scope thereof, it is to be understood that the invention is not limited to the specific embodiments.

What is claimed is:

1. The method of detecting a first line mechanically and intentionally scored at a predetermined location in the surface of a sheet moving in the direction of its length, which comprises, optically projecting upon the sheet, rays forming a second fixed line in the path of, and parallel with said first line, gathering rays dispersed by said first line along substantially the whole length of said second line when said lines coincide in response to movement of the sheet, and activating light-responsive means by and in response to said gathered rays.

2. The method of claim 1, the length of said second line being substantially greater than the dimensions parallel therewith of random and accidental defects in the sheet.

3. Apparatus for breaking a sheet of glass moving in the direction of its length, and on which has been intentionally scored a first line essentially normal to said direction, comprising, means optically projecting onto the sheet, rays forming thereon a second line having a width approximating the width of said first line and of length substantially greater than the dimension parallel with said second line, of random defects accidentally occurring in the sheet, ray-activated current-generating means, optical means gathering rays dispersed by said first line when said lines coincide in movement of the sheet, and projecting the same onto said current-generating means, to activate the same and emit a signal, glass breaking means downstream from said optical projecting means, and circuit means responsive to a signal emitted by said current-generating means and connected with said breaking means, to operate the same with predetermined time delay, by and in response to said signal.

4. The apparatus of claim 3, said circuit means including filter means blocking passage to said breaking means, of signals of transient and undesirable frequencies.

5. The apparatus of claim 3, said circuit means including means for adjusting the period of said time delay.

6. Apparatus for detecting lines on a moving sheet which comprises means to form a light beam intersecting said sheet along a lighted segment in the path of the lines and parallel thereto, light-responsive means aimed at said segment along the length thereof and parallel thereto and out of the path of the light beam.

7. Apparatus according to claim 6 including an elongated light-conductor interposed between the lighted segment on the sheet and the light-responsive means and having substantially the same length as the segment.

8. Apparatus according to claim 7 including means to project upon the surface of the glass an image of a linear electric light filament.

9. The apparatus of claim 7 in which the light-responsive, current generating means is an elongated photoelectric cell attached to the end of the light-conductor.

10. The apparatus of claim 9 including an amplifier electrically connected to the output of the cell, and apparatus controlling means electrically connected to the output of the amplifier.

11. Apparatus for detecting a line in a relatively moving sheet and of distinguishing between it and aberrations of different magnitude including a linear light filament, lens means focusing the linear beam from the filament upon the surface of the sheet, shield means associated with the lens means to interrupt unfocused rays, an elongated light-conductor aimed at the image of the light filament and parallel thereto, outside the main rays transmitted and reflected by the unmarred sheet, but within the path of rays deflected by the linear aberration, and light responsive, linear, current generating means aligned with the light-conductor to receive the beam transmitted thereby.

12. Apparatus according to claim 9 in which the lens means is demi-cyclindrical and the shield means is an apertured mask attached thereto the aperture of which is aligned with the focused beam from the filament.

13. Electronic glass breaking apparatus operatively situated between a current generating detector and a glass breaker, comprising
 a filter circuit which eliminates parasitic currents of electrical origin,
 a filter circuit to eliminate signals from the sheet below a level of intensity established by the score line,
 a timing circuit which establishes the time between the receipt of a signal emitted by the score line and the starting of the breaker,
 a relay circuit which activates the glass breaker, and
 a cutoff circuit which restores the electronic circuit to inoperative condition ready for the next mark.

14. Apparatus for controlling the operation of a breaker upon receipt of an electric impulse comprising selective filtering circuit means, timing circuit means, an operating circuit, and restoration circuit means.

15. Apparatus for detecting aberrations in moving sheets and for distinguishing between artificial and casual aberrations, comprising, means for scoring in the surface of the sheet, a line of selected configuration, means for projecting upon the sheet a linear light beam of similar configuration and which is longer than the usual length of casual aberrations in the sheet, light-responsive, signal-generating means, and means gathering and concentrating rays dispersed by coincidence between said line and light beam and projecting the concentrated rays to said signalling means, to activate the same.

16. Apparatus for detecting aberrations in moving sheets and for distinguishing between artificial and casual aberrations, comprising, means for scoring on the surface of the sheet a line of selected configuration, optical means for projecting upon the sheet a linear light beam of similar configuration, light-sensitive, circuit-generating means, and means collecting rays from the beam dispersed by said scored line when said line and beam coincide in movement of the sheet, and directing said collected rays onto said light-sensitive current-generating means, to create a signal therein.

References Cited

UNITED STATES PATENTS 2,920,209   1/1960   Asten _____ 88—14 X
3,206,606   9/1965   Burgo et al. _____ 250—219

RALPH G. NILSON, Primary Examiner

T. N. GRIGSBY, Assistant Examiner

U.S. Cl. X.R.

65—174; 225—96.5; 250—223, 227; 356—210